United States Patent [19]
Asprey

[11] Patent Number: 5,386,574
[45] Date of Patent: Jan. 31, 1995

[54] TEMPERATURE COMPENSATED EXTENDED RANGE COMPUTER COMMUNICATIONS LINK

[75] Inventor: Robert R. Asprey, Harvest, Ala.

[73] Assignee: Cybex Corporation, Huntsville, Ala.

[21] Appl. No.: 144,703

[22] Filed: Oct. 26, 1993

Related U.S. Application Data

[63] Continuation-in-part of Ser. No. 736,508, Jul. 26, 1991, Pat. No. 5,257,390.

[51] Int. Cl.⁶ .............................................. G06F 1/26
[52] U.S. Cl. .................................. 395/725; 364/273.5; 364/948.4
[58] Field of Search .......................... 395/725, 800

[56] References Cited

U.S. PATENT DOCUMENTS

| | | | |
|---|---|---|---|
| 3,702,447 | 11/1972 | Koning | 332/3 |
| 4,198,650 | 4/1980 | Hongu | 358/8 |
| 4,370,680 | 1/1983 | Taguchi | 358/330 |
| 4,789,906 | 12/1988 | Urata | 358/340 |
| 4,897,731 | 1/1990 | Kuehnle | 358/335 |
| 5,126,600 | 6/1992 | Zhang | 307/474 |
| 5,126,846 | 6/1992 | Niimuura | 358/167 |

*Primary Examiner*—David Y. Eng
*Attorney, Agent, or Firm*—Phillips & Beumer

[57] ABSTRACT

A temperature compensated video transmission system including a D.C.-video frequency amplifier for supplying a computer monitor wherein the operating bias for two opposite polarity type transistors are directly coupled collector-to-base, and bias to this coupling is provided through the base-emitter junctions of two serially connected transistors, the base and collectors of these transistors being directly coupled, whereby D.C. drift, with temperature, of the amplifier is prevented.

14 Claims, 5 Drawing Sheets

TEMPERATURE COMPENSATED EXTENDED RANGE COMPUTER COMMUNICATIONS LINK

CROSS-REFERENCE TO RELATED APPLICATION

This application is a continuation-in-part of application Ser. No. 07/736,508, filed on Jul. 26, 1991, now U.S. Pat. No. 5,257,390.

FIELD OF THE INVENTION

This invention relates generally to extended range communications links for computers and particularly to such a link wherein a keyboard, a mouse, a VGA monitor, and other computer peripherals may be operated up to about 800 feet from a computer.

Particularly, the invention is directed to an improved amplifier system for inclusion in the receiving end of the link.

BACKGROUND OF THE INVENTION

Computer extension systems that allow use of a keyboard, monitor, and other computer peripherals an extended distance from a computer are becoming increasingly popular, with a number of extension systems in use today. In these systems, and in a typical case, the computer is located in a more hospitable or convenient environment than the keyboard, monitor, mouse, printer, or other peripherals, these peripherals being coupled to the computer by a single cable having a plurality of insulated conductors. Signal conditioning circuitry is coupled to one or both ends of the cable and conditions the digital and video signals attenuated by the extended length of the conductors conveying the discrete signals.

Problems with these systems generally involve induced noise, particularly video noise, and attenuation of the signals by the long cable lengths and RC roll-off filters typically used by manufacturers to reduce radiated noise as per FCC Part 15 requirements. Additionally, in single ended systems, offsets in ground potentials may, in some situations, be high enough to prevent some digital devices from transitioning to a "low" logic level.

In the signal conditioning network that receives the signals from the computer, particularly video and vertical and horizontal sync circuits, problems typically arise when video amplifier circuits are provided with ground and power potentials from the cable. In this instance, after traversing the length of the cable, the power potential is not at its original level due to line losses, and in operation may fluctuate due to switching demands, causing nonlinear responses from video amplifiers supplied by this power. Further, both power and ground potentials suffer induced noise from adjacent conductors. Here, regulation of power sources in this case is not feasible because of the lack of stable reference potentials and also because of the extra power and voltage drain a regulator would impose. Also, since the analog video signals are of a wide bandwidth, from 10 kHz to 150 mHz, the combined impedance from line inductance, capacitance, and resistance attenuates some frequencies more than others, causing nonlinear response from the video amplifiers and distortion of the video signals that degrade images displayed on the monitor.

As color VGA computers and monitors enjoy increased usage, color backgrounds have become more prevalent. These color backgrounds in an extension system require higher quality digital signals than dark or black backgrounds. Signal anomalies such as ringing, reflections, and attenuation of the high frequency components, or rise and fall times, of the video signals in the long conductors of the extension cable are much more apparent with a color background than a black background. Here, ringing and reflections typically cause "ghosts" of images on the monitor, while signal attenuation causes a leading edge, with respect to the horizontal sweep, of vertical lines of images to appear fuzzy and indistinct.

Accordingly, a need has arisen for an extension system capable of transmitting video signals with data signals applied to discrete conductors of a cable, with ringing, reflections, attenuation, induced noise, and other extraneous signals being suppressed or otherwise compensated.

The applicant has devised several extended range communications systems for coupling computer video and sync signals from a computer to a remotely located monitor. Notably, U.S. Pat. No. 4,885,718, issued on Dec. 5, 1989, to Asprey et al., discloses an extension system for extending computer video signals up to 150 feet to a monitor from the computer. Here, only monochrome signals are applied to the cable, with these signals driven at TTL levels. No attempt is made to bias the video levels to a selected bias, reduce amplitude of the signals to a significantly lower level, which causes less crosstalk than a stronger signal or to limit variance in current flow to the signal conditioning network at the monitor, which causes non-linear responses of the video amplifiers therein.

In patent application Ser. No. 07/447,010, filed on Dec. 5, 1989, by Asprey et al., now U.S. Pat. No. 5,193,200, color video signals are transmitted by TTL buffers on an extended cable up to 300 feet to a monitor. Here, the signals are attenuated by a roll-off filter prior to being applied to the cable and conditioned by Schmitt-triggered amplifiers in the receiving signal conditioning network. No attempt is made to bias the signal to a higher potential, significantly reduce the amplitude of the signal, or limit variance of current flow to the signal conditioning network at the monitor.

In patent application Ser. No. 07/488,710, filed on Mar. 5, 1990, by Asprey et al., an extension system is disclosed wherein analog video signals and horizontal and vertical sync signals are used to modulate current flow through an extended conductor of a cable. In this system, the video signals are terminated at close to the characteristic impedance of the conductor. Additionally, the video signals are impedance matched to the conductor of the cable and applied thereto at close to their original levels. No attempt is made to bias the video signals to a selected level, significantly reduce their amplitude, or limit variance of the current flow to the signal conditioning network at the monitor.

Another patent application, Ser. No. 07/555,580, filed on Jul. 19, 1990, by Asprey et al., discloses extended communications links up to 1,000 feet. Here, the video signals are digital signals which are biased to a selected level and reduced in amplitude. However, the digital video signals are provided with a voltage spike on leading edges thereof as precompensation that would degrade performance of the instant invention and negate the effect of reducing crosstalk provided by significantly reducing the amplitude of the video signal.

Additionally, since this system is digital in nature, it cannot be used with the analog video signals of the instant invention since analog video signals are not compatible with the digital switching thresholds of the referenced application, which would result in analog video signals on the on the wrong side of these thresholds being lost.

With respect to the invention of the parent case of this application, which is disclosed herein, it has been found that temperature stabilization of the semiconductors of certain of the analog video circuitry is necessary where temperature variations between about 0° F. and about 110° F. or greater are encountered. This is brought about by virtue of the necessity for D.C. coupling of each of the transistors employed in the video amplifier circuit supplying the video monitor, the D.C. component of each transistor varying from approximately 750 mv when cold to about 450 mv when hot. With six transistor stages and an output transistor, the video amplifier works well when relatively cool, but when hot, the operating range of each transistor is shifted downward, resulting in increased current flow through each transistor when biased to a conductive state, and, as a result, an undesired D.C. voltage as an output to a monitor.

Thus, from the foregoing paragraph, it is to be appreciated that the amplifiers at the end of a video link which power the video inputs to a monitor present the problems indicated. There are, of course, three of these amplifiers, one for the red, blue, and green signals; and as suggested above, they require D.C. coupling which can produce detrimental effects by virtue of D.C. level drift which varies with temperature. It is the object of this invention to overcome the recited difficulties experienced with D.C. coupled amplifier driving a computer monitor.

SUMMARY OF THE INVENTION

In accordance with this invention, a D.C.-video signal amplifier is constructed of fewer stages, in this case, three stages. Despite this reduction (when compared with the six stages of amplifier 175), the resultant improvement of less cost, the total D.C. drift experienced by virtue of temperature was still excessive. Significantly, with respect to cost, it was found desirable to still employ a single rail, or polarity, power source, and this meant a complimentary transistor cascade of the transistors, e.g., in this case, an NPN-type followed by a PNP-type, in turn followed by a NPN-type.

With this configuration, and its simplicity, it was found that there was still a serious output voltage drift with temperature problem. Upon analysis, it was found that it was due to the decrease in emitter-base voltages with temperatures, in some instances, being a decrease on the order of 0.2 volt for each transistor. Applicant determined that the problem could be basically cured by compensating for the base voltage drops of the first two transistors in a three-transistor circuit, these in combination providing a gain which made the problem worse, whereas in the third transistor, there was no gain, and this did not appear to be a substantial problem.

As a first potential solution, the applicant determined that if the emitter-base biases of the first two transistor stages were biased with a bias which did decrease with temperature by like amounts, the problem might be solved. This, it would first appear, to be solved by employing diodes, utilizing their base-emitter temperature characteristics. This appeared to work over a certain range of temperatures, but upon further examination, it was found that the identity of characteristic between transistors and diodes did not cover the full range necessary for compensation as experienced by the applicant. The applicant then found that there was not identity between a base-emitter versus temperature characteristics as between diodes and transistors which extended over their useful ranges. Second, it is to be noted that there remains, after having made the choice of the employment of a transistor-base junction for compensation, how the transistors would be connected in circuit. It is to be noted that where two cascade-arranged transistors are employed, they are essentially in parallel from the point of bias, and yet the applicant found that the two compensating transistors (collectors shorted to base of each) may be simply cascaded, and the desired effect was achieved by virtue of the collector of the first transistor stage being directly connected to the base of the second one and thus there being a common connection.

DETAILED DESCRIPTION OF THE PREFERRED EMBODIMENT

Figures 1, 1A:
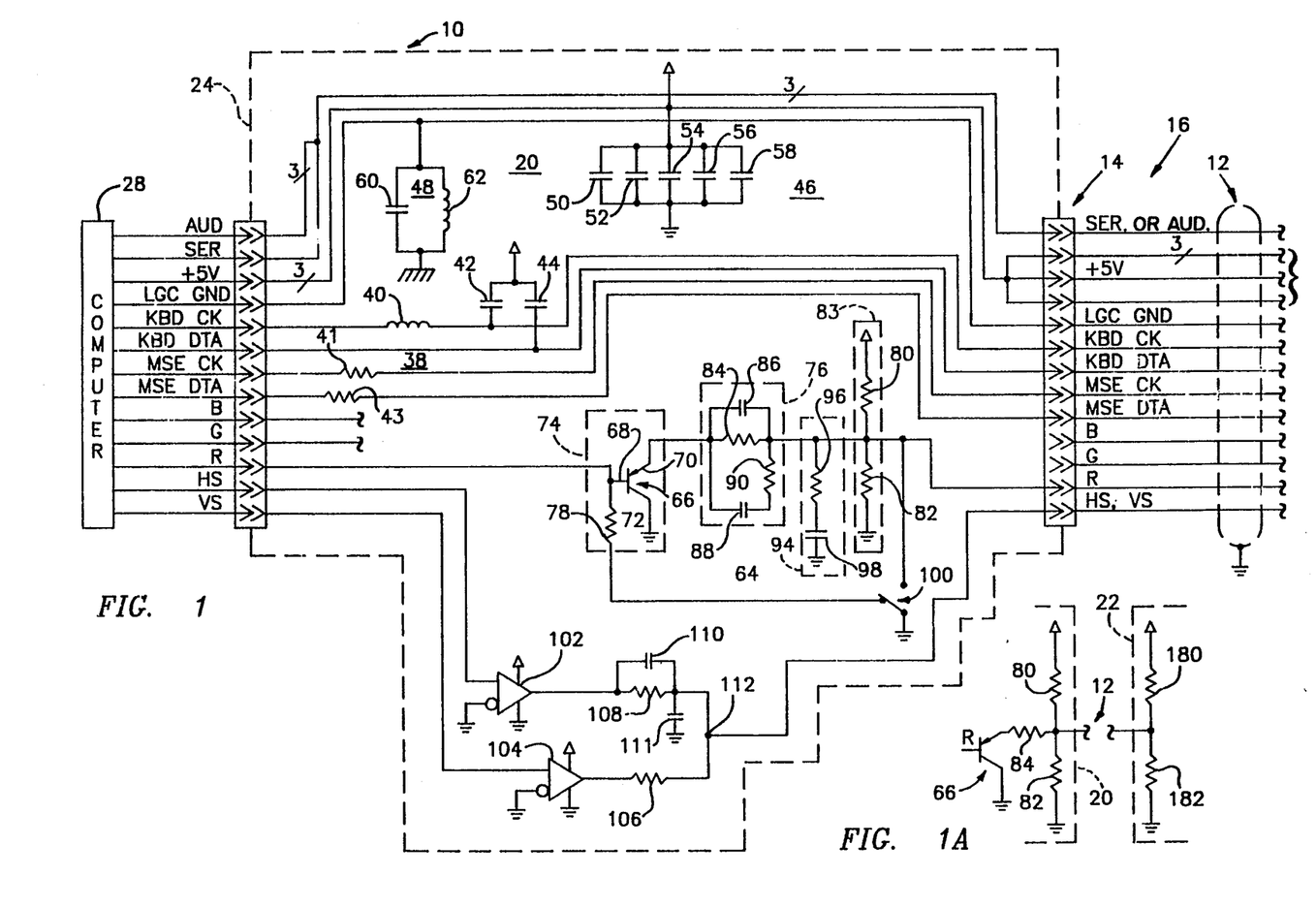
FIG. 1 is a schematic diagram of a signal conditioning network coupled to and located at a source of digital and analog signals, such as a computer, and connected to conductors of an extended cable.
FIG. 1a is a schematic diagram of particulars of construction of the present invention.

Referring initially to FIG. 1, a system 10 is shown for transmitting analog red, green, and blue, or monochrome, video signals and horizontal and vertical sync signals, keyboard and mouse clock and data signals, signals for synthesized speech or signals to and from a serial computer port, and bias power and logic ground potentials on a conventional cable 12 up to approximately 800 feet in length. The cable has a plurality of adjacent, insulated conductors designated HS, VS, R, G, B, MSE DTA, MSE CK, KBD CK, KBD DTA, LGC GND, +5 V, and SER, for passing the respective signals. While these signals typically originate in and are transmitted from a computer, any combination or subcombination of the above-named signals may be transmitted using the instant invention from any source of these signals to devices utilizing these signals.

Figure 2:
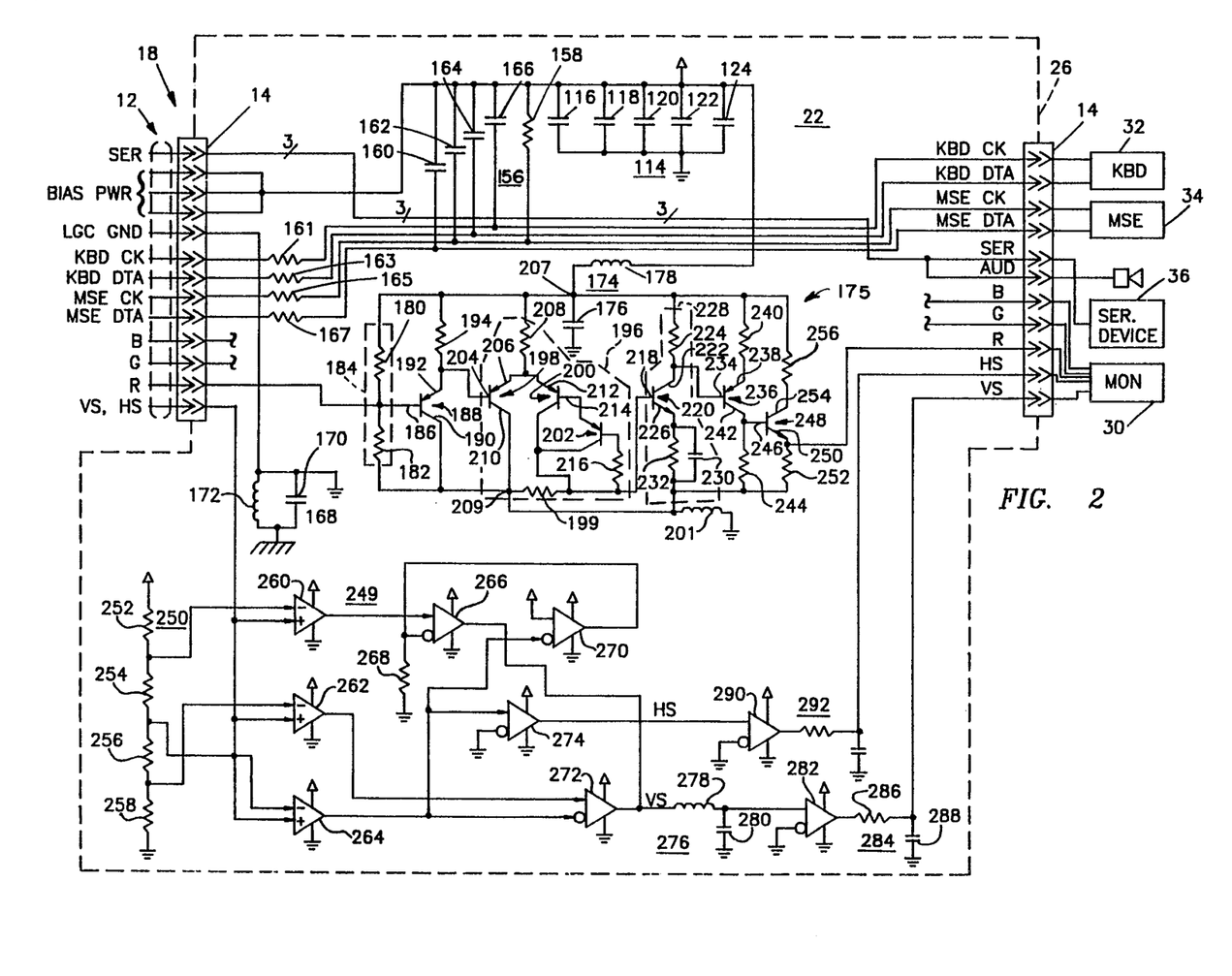
FIG. 2 is a schematic diagram of a signal conditioning network at an opposite end of the cable for receiving the signals and conditioning them prior to passing them to discrete devices.

The conductors of cable 12 are conventionally coupled using commercially available connectors 14, at opposite ends 16 (FIG. 1) and 18 (FIG. 2) to signal conditioning networks 20 (FIG. 1) and 22 (FIG. 2). Networks 20 and 22 are typically housed in enclosures 24 and 26 (dashed lines), but network 20 may be located in computer 28, and network 22 may be located in any of the components coupled to end 18 of cable 12. Network 20 is also coupled to video and sync terminals, serial port or audio output terminals, keyboard and mouse terminals, bias power, typically 5 volts, and logic ground terminals of computer 28, and passes modified video and sync signals and stabilized power and ground potentials to cable 12. Network 22, at the opposite end of cable 12, is powered by the stabilized bias potential and logic ground, although the impedance of the conductor of cable 12 causes a voltage drop that reduces the bias potential to a potential generally between 4.0 and 5.0 volts. Additionally, the ground conductor may have a voltage offset as high as 0.5 volt. Alternately, a discrete, stable, external power supply and reference ground source may be utilized to power network 22. The analog video signals R, G, and B are provided where a color analog monitor is utilized, and where a monochrome monitor is used, a monochrome signal on the G signal line is provided. Sync signals are provided by network 22 to respective terminals of a monitor 30.

In addition to the video signals, network 22 receives the clock (CK) and data (DTA) signals from a keyboard 32 and mouse 34 and applies these signals to respective conductors of cable 12 and applies the serial or audio signals, if used, from the computer to a serial peripheral device 36, such as a printer or modem for the serial device, or speaker for the audio signals. Leads from the connectors of the audio jack and serial port are connected in parallel in both signal conditioning circuits 20 and 22 so that either audio or serial signals may be sent over the respective conductors of cable 12.

In general, network 20 conditions the video signals prior to the signals being applied to discrete conductors of cable 12 and multiplexes the sync signals HS and VS such that they may be applied to a single conductor HS, VS of cable 12. The keyboard and mouse signals (CK, DTA) are filtered prior to being applied to conductors 35 KBD CK, KBD DTA, MSE CK, and MSE DTA of cable 12, and the power and ground potentials applied to cable 12 are stabilized. In the instance where a monochrome monitor is used, only circuitry for the green video signal (G) is used, with the output from the red and blue video signals (R, B) being grounded and a high impedance presented to the red and blue outputs of the video driver card of the computer. This elicits a monochrome signal from the video driver card of the computer, which is conditioned by the green video conditioning circuitry of networks 20 and 22 and passed to a monochrome monitor from network 22. In network 22, the analog video signals, attenuated by the conductors of cable 12 and conditioned by network 20, are restored to analog levels and applied to monitor 30. The sync signals are demultiplexed and also applied to monitor 30. The keyboard and mouse signals are filtered and applied to keyboard 32 and mouse 34, and the serial or audio signals are passed unchanged to the appropriate device. The power and logic ground potentials received from network 20 are also stabilized in network 22.

Examining signal conditioning network 20 in more detail, and referring to FIG. 1, the keyboard and mouse clock and data lines are each provided with noise reduction circuits 38 for reducing noise on the clock and data signals applied to the discrete conductors conveying mouse and keyboard signals. For the keyboard clock line KBD CK, an inductor, or choke 40 of about 39 microhenries, coupled in series with the clock line, blocks induced high frequency video noise from the keyboard clock input terminal of computer 28. For both the keyboard clock and data lines, capacitors 42 and 44 of about 470 picofarads each coupled between the lines and a stable source of potential, such as bias power or logic ground, shunt higher frequencies, down to about 10 kHz, to the potential. Resistors 41 and 43 of a relatively low value, such as 100 ohms, and placed in series with the mouse clock and data lines, reduce ringing of the signal. Additionally, since power, typically +5 volts, is applied to a plurality of conductors of cable 12 in order to power network 22, as will be described, conditioning of power and of the logic ground is undertaken.

Power and logic ground conditioning is accomplished by power conditioning network 46 and logic ground conditioning network 48. For power conditioning network 46, capacitors 50, 52, and 54, each of about 0.1 microfarad, are utilized to localize power surges. These capacitors are coupled between the power source from computer 28 and a ground potential, and provide a high pass filter between power and ground, allowing high frequency noise to be passed to ground potential. Capacitors 56 and 58, of 22 microfarads and 0.33 microfarad, respectively, provide stabilization against low frequency transient fluctuations. For the logic ground conductor LGC GND, LC network 48 comprising electrolytic capacitor 60 of about 470 microfarads coupled between the logic ground conductor and chassis ground shunts low frequencies, such as 60 Hz, to chassis ground, while inductor 62, of about 39 microhenries and coupled in parallel with electrolytic capacitor 60, passes higher frequencies up to about 5.0 kHz to chassis ground. This stabilizes the ground potential of logic ground and removes induced noise from the logic ground conductor of cable 12. No conditioning is undertaken for the serial or audio lines.

Network 20 includes discrete video signal conditioning circuits for conditioning red, green, and blue analog video signals from computer 28, with only the red circuit being shown. These video signals from computer 28 range in amplitude from about 0 to 700 millivolts beginning at 0 volts and rising to about 700 millivolts, the video signal having a minimum width of about 50 nanoseconds. This width corresponds to a single picture element (pixel) of the monitor, as shown for a video pulse 29 of waveform A in FIG. 4. Thus, the circuitry for conditioning the red, green, and blue signals must be capable of linearly amplifying and passing signals of a bandwidth from about 10 kHz to 150 mHz.

Figure 4:
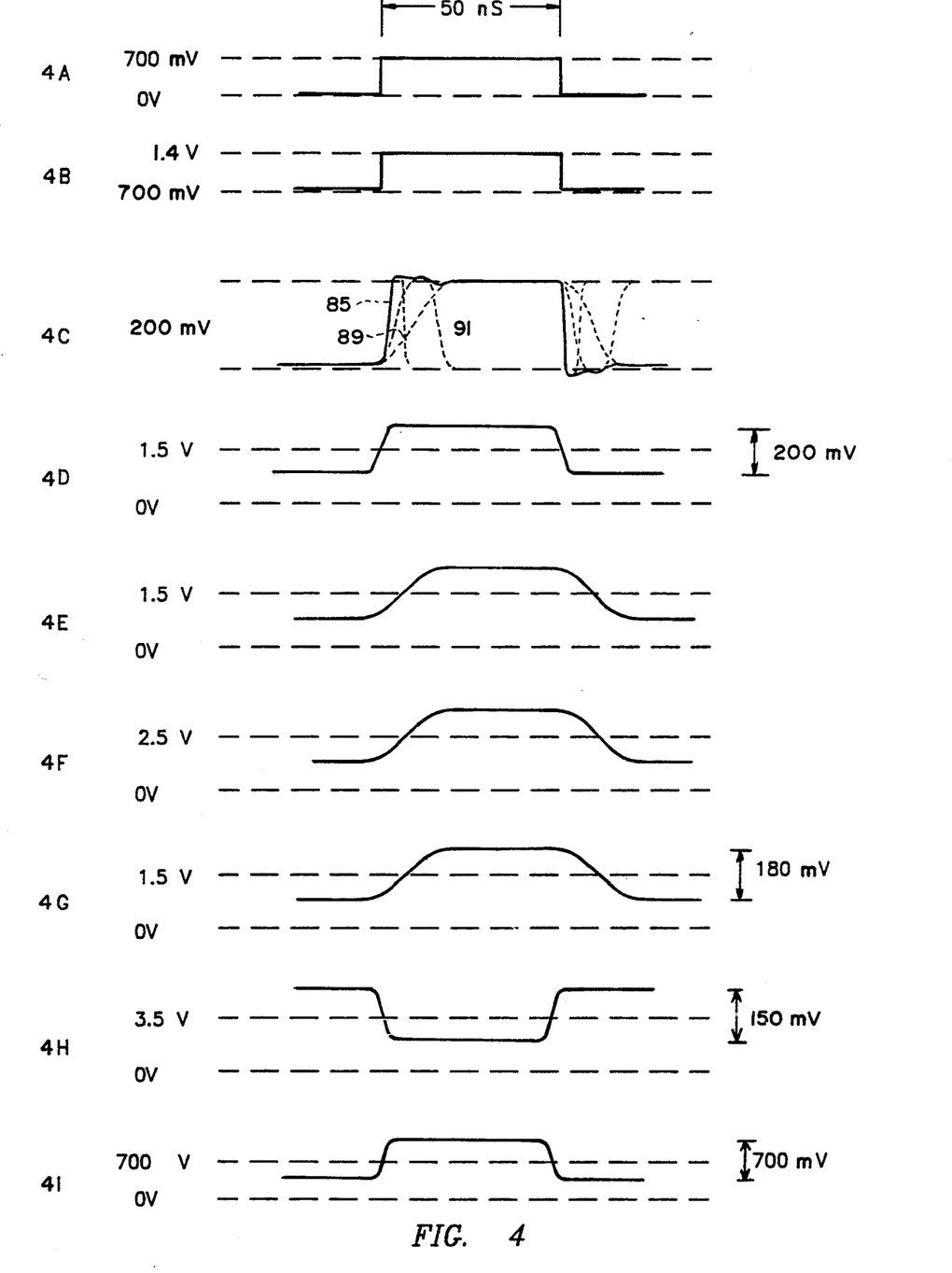
FIG. 4 is a view of a video signal waveform at various points in the signal conditioning networks.

Initially, in each of the video signal conditioning circuits, a PNP transistor 66 (FIG. 1) is coupled in emitter-follower configuration having a base 68 coupled to the red video signal from computer 28, a collector 72 coupled to ground, and provides on emitter 70 a current-amplified red video signal (waveform B of FIG. 4). This current-amplified video signal is applied to a filter and tuning network 76. In network 76, a resistor 84 of about 100 ohms passes D.C. components of the signal, which critically damps signal transitions, as shown by critically damped curve 91 (waveform C), and passes all frequency components of the video signal. A high pass capacitor 86 of about 100 picofarads in parallel with resistor 84 presents a smaller impedance to high frequency components of the signal, and provides a short burst of energy 85 (waveform C) to leading edges of signal transitions. A capacitor 88 of about 470 picofarads is placed in series with a resistor 90 of about 680 ohms, with resistor 90 and capacitor 88 coupled in parallel across resistor 84. Capacitor 88 and resistor 90 form a medium pass filter that passes mid-range components of the video signal. Also, capacitor 88 provides an additional, longer burst of energy 89 to signal transitions shortly following the short burst of energy 85 provided by capacitor 86, this energy being in the critically damped rising and falling regions of the signal. These bursts of energy combine with the critically damped curve 91, as shown in the darkened waveform C, to effectively shorten the rise/fall times while maintaining critical damping, which suppresses ringing, providing a crisp leading edge to black to white transitions of images on the monitor. While specific values of components are enumerated herein for network 76, in this example for a cable of about 800 feet in length, other values of components may be used, and additional resistors and capacitors may be coupled in parallel with resistor 84 and capacitor 86, for tuning network 76 to particular cable lengths. After passing through network 76, the signal is then passed to an anti-reflective and attenuating circuit 94 that dampens reflected signals on the R conductor, and dampens high frequency components of the video signal in excess of the 150 mHz video signal; these high frequency components being present due to digital switching employed in computer 28 to create the analog signal.

Bias power for transistor 66 is provided via resistor 80 of about 180 ohms coupled between conductor R and bias power, with a second resistor 82 of about 324 ohms coupled between conductor R and ground. Resistors 80 and 82 form a voltage divider network 83 having a ratio of about 1:1.8. With such a ratio, and with no video signal applied to transistor 66, an unloaded potential of about 3.4 volts is impressed on the R signal line coupled to the R conductor of cable 12, with this potential applied via resistor 84 to emitter 70 of transistor 66. However, the potential on the R conductor is modified by a second voltage divider network 184 in network 22 and illustrated in the simplified transmission scheme of FIG. 1a. Here, a resistor 180 of about 390 ohms is coupled in series with a resistor 182 of about 100 ohms, with resistor 180 coupled to power and resistor 182 coupled to ground, and a mid-point between these resistors coupled to the R conductor of cable 12. Resistors 180 and 182 have a ratio of about 4:1, and provide about 1.0 volt potential to the R conductor. Since potential from resistor 80 is presented with a relatively higher impedance to ground through resistor 82 and the combined impedance of resistor 84 and transistor 66 than through resistor 182, a current flow of about 6.0 milliamps through the R conductor from resistor 80 to ground via the relatively lower impedance of resistor 182 is established, maintaining about 1.5 volts quiescent potential applied to the conductor by network 83. This biasing of about 1.5 volts offsets line losses and biases the signal above a potentially noisy ground potential, and provides a voltage region between 0 to 5.0 volts which is offset by at least one diode drop (700 millivolts) and within which the signal fluctuates. Thus, when the 0 to 700 millivolt analog video signal is applied to the base of transistor 66, its resistance is varied in accordance with the signal, causing a signal current flow of about 8.9 milliamps maximum and representative of the video signal to flow from resistor 80 through transistor 66 via resistor 84 to logic ground. This in turn varies the 6.0 milliamp current flow between resistor 80 and resistor 182 with a current swing of about 1.5 milliamps, as opposed to current fluctuations of about 10 milliamps for a conventional connection between a computer and monitor. As such, the described 1.5 volt potential across resistor 182 fluctuates in accordance with the video signal with an amplitude of about 200 millivolts centered about the 1.5 volt potential, as shown in waveform D of FIG. 4. This reduced-in-amplitude signal with the low, 1.5 milliamps current fluctuations creates less crosstalk in adjacent conductors than a stronger signal, allowing keyboard and mouse clock and data signals to be applied to conductors in the same cable with the video signals. This eliminates the necessity of using discretely shielded conductors or twisted pair conductors in cable 12, allowing use of a relatively inexpensive cable. Also, it is believed that the continuous current flow of about 6.0 milliamps on the R, G, and B conductors of cable 12 dampens induced noise from adjacent conductors. Further, voltage divider networks 83 and 184, along with the reactance of circuits 76 and 94, terminate the video conductors at about 53.5 ohms at a D.C. potential, close to the characteristic high frequency impedance of the transmission conductors in cable 12, which is about 54 ohms, and dampen ringing and reflected signals that may be present. While the disclosed values of resistors 80, 82, 84, 180, and 182 are selected to provide attenuation of the video signal to about a 200 millivolt level, it is believed these values may be varied to provide attenuation of the video signal up to about sixty percent of the original 700 millivolt signal, or about 420 millivolts, without seriously degrading operation of the instant invention.

A switch or jumper 100 selectively applies a ground potential to load resistor 78 of about 82 ohms, or to conductor R. With the ground applied to resistor 78, indication is provided to the video driver card that a color monitor is coupled to the computer. When switch 100 applies a ground potential to conductor R, a high impedance through resistor 78 is applied to the video driver card, signifying that a monochrome monitor is coupled to computer 28. This switch is absent in the green signal conditioning circuit because the green circuit provides and conditions the monochrome signal. An 82-ohm load resistor is used in order to reduce the load on the video driver card of the computer and to provide a slightly higher amplitude video signal, at or above 700 millivolts, to transistor 66 in order to assist in offsetting voltage losses.

The sync signals, horizontal sync (HS) and vertical sync (VS) from computer 28, are amplitude multiplexed by horizontal sync gating buffer 102 and vertical sync gating buffer 104. Buffers 102 and 104 each have an active "low" enable tied to a ground potential, meaning that the HS and VS pulses of about 3.5 volts are freely provided by buffers 102 and 104. For multiplexing these signals, a resistor 106 of about 1K ohms in series with output of amplifier 104 reduces amplitude of the VS pulses to about 1.2 volts, and a resistor 108 of about 510 ohms in series with the output of amplifier 102 reduces amplitude of the HS pulses to about 2.35 volts, or about twice the amplitude of the VS pulses. Resistors 106 and 108 are selected to provide an amplitude ratio between the horizontal and vertical sync signals of about 2:1 so that, when the HS and VS pulses are superimposed on one another, the VS portion of the combined signal is about half the amplitude of the HS portion of the signal.

Figure 3:
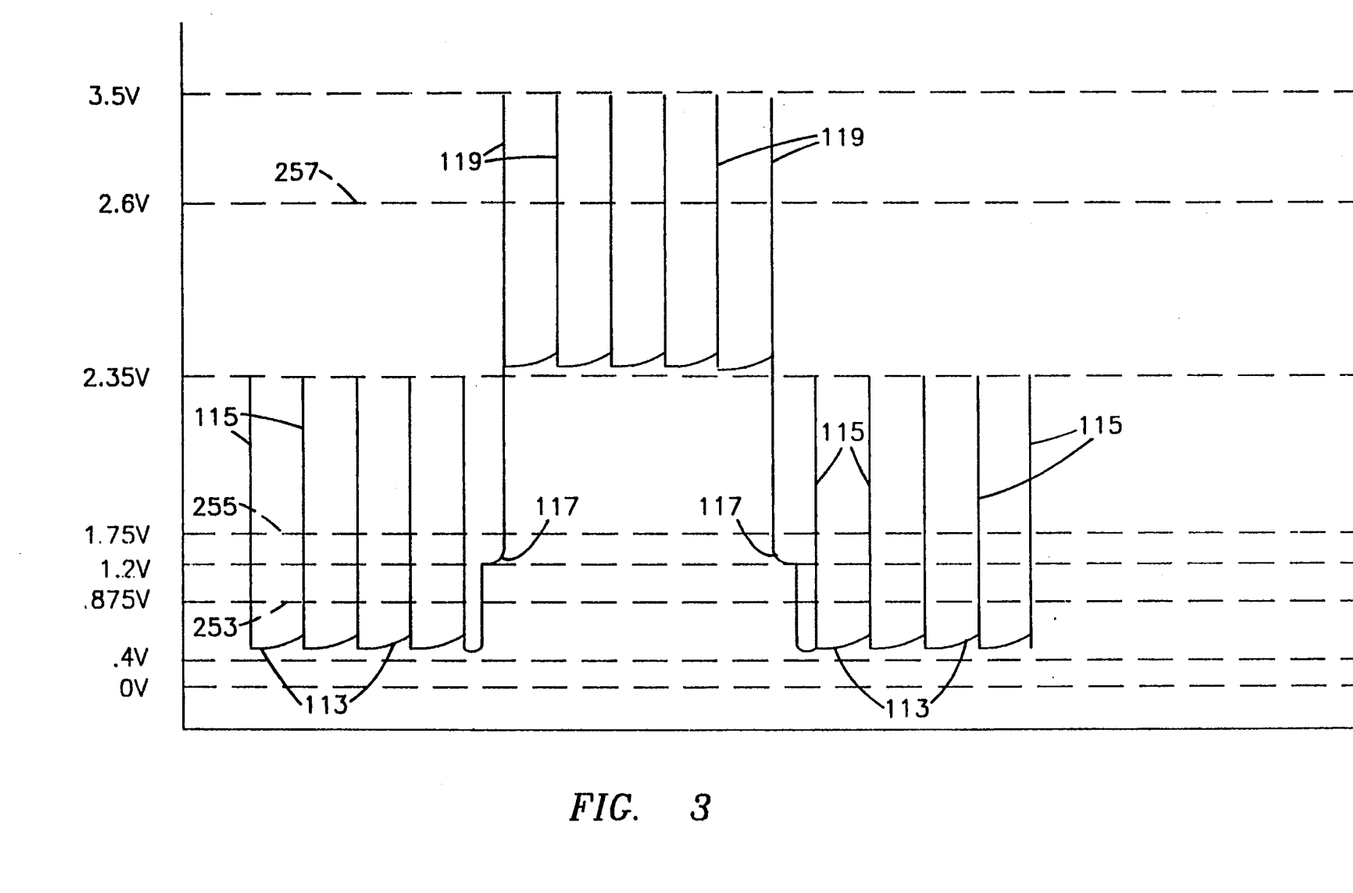
FIG. 3 is a view of a multiplexed sync signal waveform of the present invention.

A filter capacitor 110 of about 470 picofarads in parallel with resistor 108 passes high frequency components of the HS signal, and a capacitor 111 of about 2,200 picofarads between the reduced HS signal and ground comprises a roll-off filter to limit noise radiation. The output of this filter network, a 2.35 volt HS sync signal, is wire OR'd at point 112 with the 1.2-volt signal from buffer 104 and resistor 106 to provide an amplitude modulated signal containing a higher amplitude of HS signals and a lower amplitude of VS signals, with this combined signal applied to a single conductor HS, VS of cable 12. Thus, and referring to FIG. 3, with no sync signal, a "low" logic level 113 is seen on the sync conductor HS, VS; with an HS pulse only, a voltage pulse 115 of about 2.35 volts is seen on conductor HS, VS; with a VS pulse 117 only, a voltage pulse of about 1.2 volts is seen on conductor HS, VS; and with both the HS and VS pulses present, a voltage pulse 119 of about 3.5 volts is seen on conductor HS, VS. Since the VS pulse 117 is of a much lower frequency than the HS pulse 115, several of the HS pulses may occur during the VS pulse, causing the combined HS and VS pulses to rise to the full 3.5 volt level, with the HS pulses occurring during the VS pulse falling only to about 2.35 volts.

At the opposite end of cable 12, in signal conditioning network 22, the bias power potential, which is reduced to a potential of between 4.0 and 5.0 volts due to line losses and applied to at least three conductors of cable 12 in order to distribute current flow to network 22, is again conditioned to filter any induced noise from the power potential powering network 22. For stabilizing the power potential, a filter network 114 comprising capacitors 116, 118, 120, and 122 of about 0.1 microfarads and a capacitor 124 of about 22 microfarads are coupled between power from the power conductors of cable 12 and logic ground. As with network 46 in signal conditioning network 20, the larger capacitor stabilizes the power potential by eliminating transient fluctuations, with the smaller capacitors passing high frequency noise to the ground potential. Also, the keyboard and mouse clock and data lines are filtered by a noise filtering network 156, which includes a pull-up resistor 158 of about 5.1K on the mouse clock line to decrease the rise time of the mouse clock signal. Capacitors 160, 162, 164, and 166, of about 470 picofarads each, provide a high pass filter to shunt high frequency noise induced in the clock and data signals to the stabilized power potential. Also, series resistors 161, 163, 165, and 167, each of about 100 ohms, prevent ringing of the clock and data signals.

Still further, an LC network 168 comprising a capacitor 170 of about 470 microfarads and an inductor 172 of about 39 microhenries is coupled between logic ground and chassis ground. This network passes any D.C. offset and low frequencies from logic ground to chassis ground, stabilizing the logic ground potential. Further yet, for the discrete video amplifiers as shown for the red video amplifier, the power potential is further conditioned by an LC network 174 comprising a capacitor 176 of about 0.33 microfarad and an inductor 178 of about 39 microhenries prior to being applied to the video amplifiers. These networks block high frequency noise which may be present in the power source. Additionally, for high frequency choking of the logic ground potentials for the video amplifiers, a series inductor 201 of about 39 microhenries blocks this high frequency noise from the ground potential applied to the video amplifiers.

As with network 20, the audio and serial leads in network 22 to the audio and serial connectors of the respective devices are coupled in parallel with the three conductors in cable 12, with these conductors conveying either serial signals or audio signals.

Each of the discrete identical red, green, and blue video signal conditioning networks 175 (only the red circuit shown for convenience) linearly restore the video signals received from cable 12 to analog video levels and provide them to monitor 30. Initially, the high frequency components of the video signals received by network 22 are attenuated by the conductors of cable 12, as shown in waveform E of FIG. 4. This attenuated signal is applied to a voltage divider network 184 having resistor 180 of about 390 ohms coupled between video power supplied as described and conductor R and a resistor 182 of about 100 ohms coupled between conductor R and the conditioned ground potential. Network 184 functions as described above by providing a quiescent voltage of about 1.5 volts at 6 milliamps current flow in conjunction with the termination network in the transmitter such that the signal appears as shown in waveform E of FIG. 4. Also, network 184 assists in terminating the video conductors at close to their characteristic impedances as described.

The voltage signal across voltage divider network 184 is applied to base 186 of a transistor 188 having a collector 190 coupled to logic ground and an emitter 192 coupled via resistor 194 of about 82 ohms to video power terminal 207. Biased as such in emitter follower configuration, with a potential of between 4.0 and 5.0 volts from resistor 194 on emitter 192, the video signal of about 200 millivolts with a +1.6 volt offset potential is applied to base 186 of transistor 188. Transistor 188 provides a current amplified flow having a potential from about 2.2 to 2.4 volts, as shown in waveform F. The fluctuating potential of about 2.2 to 2.4 volts is taken from collector 192 of transistor 188 and applied to a non-inverting, emitter-coupled, near constant current amplifier circuit 196 consisting of PNP transistors 198, 200, and 202, with transistors 200 and 202 coupled in a Darlington configuration and transistor 198 coupled in common emitter configuration to transistor 200. The bias potential from resistor 208 of about 68 ohms and coupled to video power provides from about 2.9 to 3.1 volts to the common emitters 206 and 212, with collector 210 of transistor 198 coupled to ground via RF choke 201. The collector of transistor 200 is coupled to the collector of transistor 202, to ground via resistor 199 and choke 201, and to the base of transistor 202 through resistor 216 of about 100 ohms.

Coupled as described, the video signal from emitter 192 of transistor 188 applied to base 204 of transistor 198 causes a current flow image of the video signal with a current swing of about 2.9 milliamps to flow through transistor 198, with potentials of this flow, or the video signal, appearing across resistor 199. Thus, as the video signal rises, current flow through transistor 198 decreases, in turn decreasing the potential across resistor 199 and decreasing the potential applied to the base of transistor 202 via resistor 216. This decreases resistance of transistor 202, lowering the potential applied to base 214 of transistor 200, lowering resistance of transistor 200 and causing an increase in current flow therethrough. This current flow through resistor 200 is inversely proportional to the decrease in current flow through transistor 198.

Conversely, a decrease in signal potential applied to base 204 causes an increase in current flow through transistor 198, which increases the potential across resistor 199 and increases the potential applied to the base of transistor 202 through resistor 216. This biases transistor 202 to a higher resistance, allowing the potential on base 214 of transistor 200 to increase. This biases transistor 200 to a higher resistance and decreases current flow through transistor 200; this current flow being inversely proportional to the increase in current flow through transistor 198.

The 200-millivolt fluctuations across pull-up resistors 194 and 208 cause power supply current variations which are opposed, and tend to cancel, fluctuations of about 9.3 milliamps at the output transistor 248. Thus, an input voltage increase of about 200 millivolts results in current flow through resistors 194 and 208 to be reduced by about 2.4 milliamps and about 2.9 milliamps, respectively, which offset the increase of 9.3 milliamps through transistor 248 by about 5.3 milliamps. This results in a net increase of current to the amplifier of only 4 milliamps. Additionally, circuit 196 reduces voltage offset of the video signal by about ten percent to about 1.3 volts and reduces amplitude of the video signal to about 180 millivolts. As such, the video signal is centered about 1.3 volts, as shown in waveform G of FIG. 4. Additionally, due to inversion and reinversion of the video signal in the output stages of the video circuit, variations of current flow to the red, green, and blue video conditioning circuits is further limited. This results in current flow to each of the red (R), green (G), and blue (B) video amplifiers being held nearly constant, at about 50 milliamps which, as stated, swings only about 4 milliamps for a maximum 9.3 milliamp output. Thus, current perturbations in the power conductors that can cause radiated crosstalk to adjacent conductors in cable 12 and non-linear responses from the video amplifiers are kept to a minimum.

Next, the red video signal, having about a 180-millivolt swing centered about a bias of approximately 1.3 volts, is taken from the collector of transistor 200 and applied to base 218 of transistor 220, which transistor has a collector 222 coupled via a 68-ohm resistor 224 to bias power and its emitter 226 coupled to a frequency dependent degenerative feedback network 228. Network 228 provides decreasing impedance with increasing frequency by virtue of the values selected for capacitor 230, which is about 220 picofarads, and resistor 232, which is about 82 ohms. This network, in conjunction with resistor 224, allows transistor 220 to provide increasing gain with increasing frequency and some voltage attenuation for low frequency signals. For instance, a 1-mHz signal applied to base 218 of transistor 220 provides unity gain, while a 10 mHz signal applied to base 218 causes transistor 220 to provide a gain of about 1.5. Thus, the higher frequencies of the red video signal, which extend upward to about 150 mHz, are amplified and inverted, as shown in waveform H of FIG. 4, providing frequency compensation to these higher frequencies that are lost in the earlier and following stages of the video signal conditioning networks, and in the conductors of cable 12. The signal is then taken from the collector of transistor 220 and has a slightly reduced swing of about 150 millivolts centered about a potential of about 3.5 volts. In inverting the signal, circuit 228 draws a current flow which fluctuates about 2.4 milliamps from terminal 207, generally offsetting or countering the oppositely phased current flow through the following resistor 240.

The frequency-enhanced output of network 228, a signal of about 180 millivolts with a current variation of about 2.2 milliamps and biased to a potential of about 3.5 volts, is taken from the collector of transistor 220 and applied to base 234 of transistor 236. Emitter 238 of transistor 236 is coupled to video power via a resistor 240 of about 82 ohms, and collector 242 is coupled to ground via a resistor 244 of about 510 ohms. Biased and coupled as such, transistor 236 reinverts the red signal, as shown in waveform I of FIG. 4, which was inverted by transistor 220, and provides a voltage gain of about 6.0 with a maximum current flow of about 1.8 milliamps, boosting the signal to have an amplitude swing of about 700 millivolts. Also, due to the values selected for resistors 240 and 244, the center point of the signal is reduced from 3.5 volts to about a 1.15-volt potential. This amplified signal is applied to base 246 of transistor 248 which has an emitter 250 coupled to ground via a resistor 252 of about 1K ohms and a collector 254 coupled to bias power via a current limiting resistor 256 of about 82 ohms. Coupled in emitter-follower configuration, transistor 248 reduces the bias level of the signal to a video level so that the signal swings from 0 to 700 millivolts, with a current swing of from about 0 to 9.3 milliamps and provides power to drive the signal across the 75-ohm load in monitor 30. It is noted that the cumulative current swing through network 196 and transistor 188, being 2.9 milliamps and 2.4 milliamps, respectively, are alike in phase and therefore additive to produce a swing of about 5.3 milliamps, partially cancelling the oppositely phased current flow through output transistor 248. Also, current flow through transistor 220 and 236 is approximately equal in magnitude and of an opposite phase such that these current flows cancel each other. This produces a net current swing through network 22 of about 4.0 milliamps, for a maximum 9.3-milliamp output, with this 4-milliamp current swing centered about a current flow of about 50 milliamps for network 22. Additionally, it is seen that the values of resistors 194 and 208 may each be changed to about 40 ohms, which would result in increased current flow through transistor 188 and network 196, completely off-setting current flow through buffer transistor 248. However, this would increase current flow through the conductors of cable 12 and possibly increase the voltage drop thereacross to a lowered potential such as to cause unpredictable operation of the keyboard and mouse. It has been found that the disclosed values for resistors 194 and 208, 82 and 68 ohms, respectively, provides an acceptable compromise between current fluctuations in the power conductors and too much current flow therein, which would produce the unacceptable voltage drop. In the instance where it is contemplated to provide external power to network 22, reducing resistance of resistors 194 and 208 in order to completely balance current flow to the video amplifiers is a feasible approach.

Next, the demultiplexing of the amplitude multiplexed sync signals by demultiplexing circuit 249 will be examined. As will be recalled, the HS and VS pulses are amplitude multiplexed at a 2:1 ratio. For separating the HS and VS signals, the multiplexed signal is first applied to the non-inverting input of comparators 260, 262, and 264. A voltage divider network 250 consisting of resistors 252, 254, 256, and 258, with resistor 252 coupled to bias power and resistor 258 coupled to a ground potential, provides three voltage levels which are applied to comparators 260, 262, and comparator 264 as reference potentials. For comparator 260, the reference potential supplied by resistors 252 and 254 to the inverting input is about 2.6 volts; for comparator 264, resistors 254 and 256 provide about 1.75 volts to the inverting input; and for comparator 262, resistors 256 and 258 provide about 0.875 volt to the inverting input. Thus, thresholds 253, 255, and 257 (FIG. 3) are established at 0.875 volt, 1.75 volts, and 2.6 volts, respectively, above which the respective comparator will be triggered to provide an enabling output at a digital logic level, typically 3.5 volts.

The output of comparator 260 is coupled to one input of a buffer amplifier 266, with the other input of buffer 266, an active low enable, coupled to ground via a 1K resistor 268 and to the output of a like buffer amplifier 270. Amplifier 270 is coupled as an inverter having an input tied to bias power and the active low enable thereof coupled to the output of comparator 264, the active low enable of buffer 272, and the input of buffer 274. Buffer 274, having its active low enable coupled to ground, serves as a buffer amplifier which freely passes the signal from comparator 264 as the HS signal. Thus, when a pulse 119 (FIG. 3) on sync line HS, VS goes above 2.6 volts (threshold 257), signifying a combined VS and HS pulse, comparators 260, 262, and 264 provide a HIGH logic level to the active low enable of amplifiers 270 and 272, disabling them, and applying a HIGH to the input of amplifier 274. Amplifier 274, having its active low enable tied to ground, in turn passes this HIGH as a HS pulse during the duration of the VS pulse. The VS pulse is obtained as HS pulse 119 falls below 1.5 volts (threshold 255) but above 0.875 volt (threshold 253), switching off comparators 260 and 264, allowing the HIGH from comparator 262 to be passed by amplifier 272 as a vertical sync pulse. Thus, the VS pulse is obtained from amplifier 266 when the multiplexed signal is above 2.6 volts and from amplifier 272 when the multiplexed signal is above 0.875 volts and below 1.5 volts.

In the instance of an HS pulse occurring in the absence of a VS pulse, and with the HS pulse rising to 2.35 volts, comparators 262 and 264 provide a HIGH output. The output of comparator 264 is coupled to the active low enable of buffers 272 and 270 and to the input of buffer 274. Coupled as described, the HS sync signal rising above 1.5 volts provides a logical HIGH on the output of comparator 264 and disables buffer amplifiers 270 and 272 and applies a HIGH logic level to buffer 274. This HIGH level is passed by buffer 274 as a horizontal sync pulse. Concurrently, the HIGH applied to the active low enable of amplifier 270 disables amplifier 270 and allows amplifier 266 to be enabled by the ground potential via resistor 268. Amplifier 266 then passes the low from amplifier 270, signifying absence of a VS pulse.

For obtaining a VS pulse in the absence of an HS pulse, the multiplexed signal rises to 1.2 volts, above the threshold 253 for comparator 262, causing comparator 262 to output a HIGH. This HIGH is applied to the input of amplifier 272, which is enabled by a low to its active low enable from comparator 264, allowing amplifier 272 to pass this HIGH as a VS pulse.

The vertical sync pulses are next applied to an LC network 276, consisting of an inductor 278 of about 39 microhenries and a capacitor 280 of about 0.22 microfarad, circuit 276 serving as a low pass filter to remove high frequency switching pulses or "glitches" caused by switching of comparators 260 and 262. This filtered VS signal is then applied to a buffer amplifier 282, which boosts the signal to a TTL level, after which the signal is applied to a noise reduction filter 284. Filter 284 comprises a series resistor 286 of about 100 ohms followed by a capacitor 288 of about 470 picofarads coupled in parallel to ground. This network reduces radiated noise as per FCC Part 15 requirements. Next, the signal is applied to monitor 30 through conventional cables and connectors 14.

The horizontal sync pulse from the demultiplexing circuit is applied directly to a buffer 290 for boosting the signal to TTL levels and then applied to an RC noise reduction circuit 292 similar to circuit 284. The HS signal is then applied to monitor 30 via conventional cables and connectors and cables 14.

In operation, and referring to FIG. 1, the analog red, green, and blue video signals from computer 28 are each applied to a discrete signal conditioning circuit 64 (only the red circuit shown) of network 20 where the signal is applied first to base 68 of transistor 66 and across resistor 78. With switch 100 in the position shown, the driver card (not shown) in computer 28 senses about 82 ohms to ground and responsive to this impedance provides analog color video signals on video output terminals R, G, and B. With switch 100 in the other position, the driver card senses a high impedance and provides a monochrome signal to the G signal conditioning circuit, which is identical to circuit 64 excepting that resistor 78 is coupled directly to ground and switch 100 is absent. In either instance, the signal to base 68 is current amplified, with the potential thereof taken from emitter 70 and provided to filter network 76, which dampens ringing signals that may be generated on the conductor. The signal is then passed to network 94, which dampens reflective signals and attenuates the unused, high frequency digital computer-generated noise, reducing radiated noise. The video signal is then passed to voltage divider network 83. Network 83, in concert with network 184, biases the signal to about 1.5 volts and reduces amplitude of the signal to about 200 millivolts, after which the signal is applied to the R conductor of cable 12. The described current flow between resistor 80 of network 83 and resistor 182 in network 184 provides damping of induced noise in the R video conductor of cable 12, while the voltage divider networks 83 and 184, along with circuits 76 and 94, terminate the R conductor at close to its characteristic impedance, eliminating reflective and ringing signals.

In signal conditioning network 22, where the R signal is received, voltage divider 184 also serves to maintain the biasing and damping of the signal to have a swing of about 200 millivolts about a 1.5 volt offset and passes the video signal to base 186 of emitter-follower transistor 188. The signal is current amplified through transistor 188, with potentials of this current fluctuations taken from emitter 192, and then passed to base 204 of transistor 198. As stated, the current flow through transistors 198, 200, and 202 changes by about 2.9 milliamps and is similarly phased with current flow through transistor 188. The signal is taken from the collector of transistor 200 and applied to base 218 of transistor 220. Transistor 220, due to the frequency-dependent gain as set by capacitor 230 and resistor 232, amplifies higher frequency signals and slightly attenuates low frequency signals and inverts the signal, with the inverted signal passed to base 234 of transistor 236. Transistor 236 reinverts the signal and amplifies the signal with a gain of about 6, with a change in current flow of about 2.4 milliamps. This inversion and reinversion performed by transistors 220 and 236 do not affect current stability since they are approximately equal in magnitude but opposite in phase. This partially cancels the change in current flow through transistor 248 coupled in emitter-follower configuration, which powers the signal across the 75 ohm load in monitor 30. Bias power for each of the R, G, and B video network is filtered by an inductor 178 in series with the bias power, and a capacitor 176 shunts high frequency noise to ground.

The sync signal is amplitude multiplexed, or mixed, in network 20 by wire OR'd resistors 106 and 108 in a 2:1 ratio, with the horizontal sync having the higher amplitude signal of about 2.35 volts and the vertical sync having a lower amplitude of about 1.2 volts, with the horizontal sync pulse being offset by the amplitude of the vertical sync pulse during concurrently occurring horizontal and vertical sync pulses. The combined sync signal is then applied to a conductor of cable 12 and received by the demultiplexing circuit 249 in network 22. Here, the mixed signal is applied to the non-inverting input of comparators 260, 264, and 262, which comparators provided with reference potentials such as to establish thresholds at 2.6 volts, 1.75 volts, and 0.875 volt, respectively. Accordingly, a sync signal rising to or above 2.6 volts, indicating horizontal pulses occurring during a vertical sync pulse, elicits an enabling output from comparators 260, 262, and 264, while a sync pulse rising to or above 1.75 volts, indicating a horizontal sync pulse only, elicits an enabling output from comparators 262 and 264; and a sync pulse rising to or above 1.2 volts, indicating a vertical sync pulse only, elicits an enabling output from comparator 264. The output of comparator 264 is provided to a buffer amplifier 274, which passes the signal as a horizontal sync pulse. The vertical sync pulse is obtained from either comparator 260 or comparator 262, with the signal from these comparators passed by one of gates 266 or 272, depending on whether or not the vertical sync pulse is occurring concurrently with the horizontal sync pulses. In the instance of a vertical pulse only, comparator 262 provides a signal to gate 272, which is enabled to pass the vertical pulse by the absence of a horizontal pulse. In the instance of a vertical pulse occurring with a horizontal pulse, gate 266 is enabled by inverting gate 270 responsive to the occurrence of a horizontal pulse to pass the vertical pulse, with the vertical pulses applied to a filter 276 to eliminate switching spikes or "glitches." The horizontal and vertical pulses so obtained are then each applied to buffers 282 and 290 and then passed across attenuation networks 284 and 292 for reducing noise radiation prior to being applied to monitor 30.

In network 20, keyboard clock signals are filtered by choke 40 and capacitor 42, eliminating video noise on the keyboard clock conductor, with a capacitor 44 filtering video noise from the keyboard data signals. The mouse clock and data signals are each provided with low value series resistors 41 and 43 to eliminate ringing and reflections from being passed to computer 28. Bias power in network 20 is filtered and stabilized by network 46 consisting of capacitors 50, 52, 54, 56, and 58, while logic ground is stabilized by circuit 48, consisting of capacitor 60 and inductor 62 coupled in parallel between the logic ground conductor and chassis ground.

In network 22, the keyboard and mouse clock and data signals are filtered by capacitive network 156, with resistors 161, 163, 165, and 167 preventing ringing signals on the clock and data lines from being passed. Network 114 stabilizes the bias power from the bias power conductor of cable 12 and passes high frequency noise to ground, while network 168 filters the logic ground potential as described.

Figure 5:
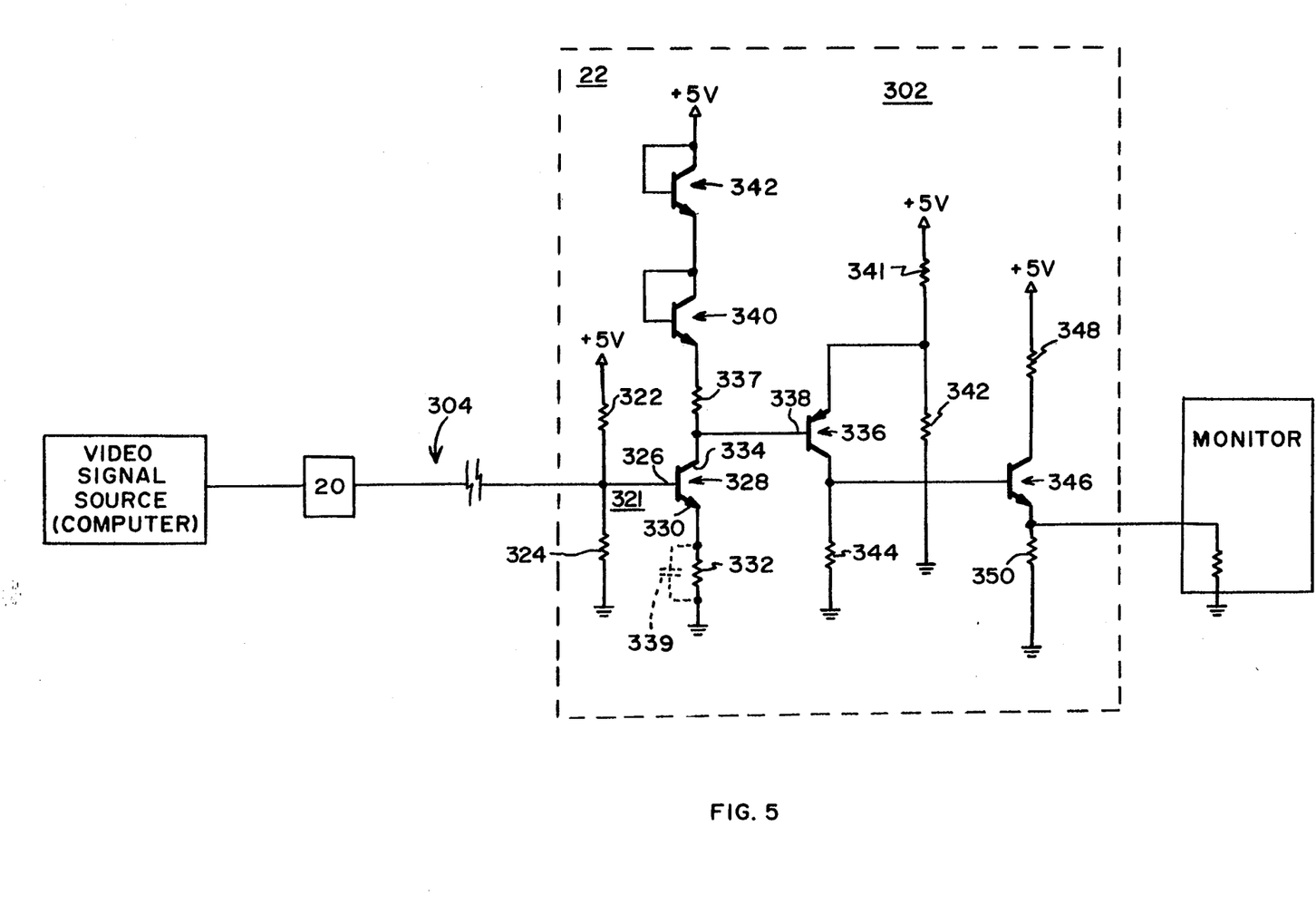
FIG. 5 is a schematic diagram of an analog D.C.-video amplifier of the present invention, being an alternate to that shown as one of the amplifiers 145 shown in FIG. 2.

In another embodiment of this invention, an alternate circuit is shown for network 22 in FIG. 5. In it, there are three transistor stages which are direct coupled to comply with a monitor requirement, which the network feeds, the requirement being that the monitor have a D.C.-video frequency range. This compact circuit employs only three serially arranged transistor stages wherein opposite polarity type transistors are serially arranged and yet powered by a single rail, polarity, power supply. Normally with such a circuit arrangement, there would occur a significant D.C. error, the D.C. significantly rising with a rise in temperature. It was discovered that this is significantly brought about by a decrease in the emitter-base voltages with temperature rise of the first two stages of the circuit or network 22 of FIG. 5.

Since the circuit is a multi-stage circuit, such being necessary for a gain, the problem of temperature induced error is compounded by the amplification surges, in this case, approximately four times amplification. Thus, in the case of the present circuit, an increase of base-emitter D.C. voltages of approximately 0.2 volts in transistor 328 and 0.2 volts in transistor 336 and with a gain of approximately 4.0 of these two stages, the effect is to increase the error introduced by temperature to approximately 1.6 volts, an intolerable amount.

As one approach to a solution to this problem, applicant considered placing diodes in series with a power supply biasing of transistors 328 and 336, it being thought that the voltages of the diodes and the base-emitter junctions of the transistors would, in effect, cancel. This solution, which appeared theoretically to work, failed to operate over the needed range of anticipated operation. Accordingly, upon further analysis, it was determined that the characteristics of base-emitter junctions of diodes and base-emitter junctions of transistors are not identical over a significant temperature range. Then, applicant discovered by the employment of the base-emitter junctions of transistors, which were simply serially arranged, would effect a desired compensation of parallel arranged transistor amplifier stages as shown in FIG. 5.

Here, and referring now to FIG. 5, one of these networks 302 is shown connected by a cable 304 as described in the foregoing to a one of the R, G, and B signal conditioning circuits of signal conditioning networks 20, also as described in the foregoing. While only one video signal conditioning network 302 is shown, it is to be appreciated that a signal conditioning network for each of the R, G, and B video signals is required. Additionally, the horizontal and vertical sync signals are amplitude multiplexed (FIG. 2) in network 20 and demultiplexed in network 22 prior to being applied to a monitor, as described above.

Prior to being applied to network 302, the analog video signal is attenuated as described in network 20 and by the conductor of cable 304 to have a swing of about 200 mv peak-to-peak. Upon being applied to network 302, the 200-millivolt signal from the signal line or conductor of cable 304 is first passed across a voltage divider network 321. Network 321 comprises resistor 322 of about 75 ohms and coupled to a source of power, while resistor 324 of about 97.6 ohms is coupled to a ground reference potential. The source of power, as described in the foregoing, is typically between about +4.0 and +5.0 volts where power is passed through conductors of cable 304. Where a separate, local power supply 325 may be provided for network 302, the source of power would typically be a stable +5.0 volts, with an associated reference ground potential. Voltage divider network 321 terminates the conductor of cable 304 and provides a voltage offset to the signal of about 1.33 volts. Coupled as such, the video signal at a mid point of network 321 swings about 200 millivolts from about 1.33 volts to about 1.53 volts.

After the video signal is passed across network 321, the signal is applied to base 326 of inverting, modulating NPN transistor 328. The emitter 330 thereof is coupled to ground via a resistor 332 of about 165 ohms, with collector 334 passing an inverted video signal to base 338 of modulating PNP transistor 336. Where necessary or desirable to compensate for any high frequency losses, a capacitor 339 is connected across resistor 332, as shown in dotted lines. Significantly, collector 334 is also coupled via resistor 337 of about 165 ohms to temperature compensating NPN transistors 340 and 342. Here, a collector of transistor 342 is coupled to the source of bias power, and the emitter coupled to the collector of transistor 340. The emitter of transistor 340 is in turn coupled to collector 334 of transistor 328 via resistor 337 and the base 338 of transistor 336. The bases of transistors 340 and 342 are coupled to collectors of the respective transistors to utilize the base-emitter drop of these transistors, which vary inversely with temperature.

The NPN transistors, transistors 328, 340, 342, and 346, used in this embodiment are type 2N2222, or equivalent, and the PNP transistor 336 may be a type 2N2907, or equivalent. Significantly, each of the first-named transistors have substantially identical voltage drops inversely variable with temperature so that as temperature increases, the voltage drop across the emitter-base junctions and between the emitters and collectors decreases. The characteristics of these voltage drops are virtually identical between the respective transistors. With this property, the transistors, when at a cold temperature of about −40° F., each have a voltage drop between the emitter and collector of about 750 millivolts. As temperature increases to a maximum of about 250° F., the voltage drop decreases to about 450 millivolts. With transistors 340 and 342 subject to the same heating conditions as the transistors of the video conditioning network, a decreasing voltage drop across the base-emitter junctions of transistors 328 and 336 due to increasing temperature is compensated by increasing current flow through transistors 340 and 342. This in turn increases bias potential applied to transistor 328 which is also applied to base 338 of transistor 336, with increase of the bias potential being directly related to temperature. The use of transistors 340 and 342 coupled in series with the bias source serves to compensate for temperature related bias voltage drift in transistors 328 and 336 and insures that such voltage compensation is closely matched to the bias voltage drift of transistors 328 and 336.

As noted, the inverted video signal from collector 334 of transistor 328 is applied to base 338 of PNP transistor 336. Here, the inverted video signal rides on a quiescent voltage offset of about 2.9 volts, and has a swing of about 320 mv peak-to-peak. The emitter of transistor 336 is coupled by a resistor 341 of about 68.1 ohms to bias power, with a resistor 342 of about 226 ohms coupled between resistor 341 and ground, forming a voltage divider network. With these values for resistors 341 and 342, about 3.67 volts is applied to the emitter of transistor 336 with no applied video signal.

The collector of transistor 336 is coupled to ground via resistor 344 of about 226 ohms, with this value selected to produce about 800 millivolts across resistor 344 at a quiescent state. As such, transistor 336 provides a voltage gain to boost the signal swing to about 1 volt, and further provides a voltage drop that reduces amplitude of the video signal such that it swings from a low of about 750 mv to a high of about 1780 mv. This video signal is taken from the collector of transistor 336, and applied to the base of NPN output transistor 346. A collector of transistor 346 is coupled to bias power via current-limiting resistor 348 of about 33 ohms, which limits current flow through transistor 346 in the event of a short circuit across the output of transistor 346. An emitter of transistor 346 is coupled to ground via resistor 350 of about 1K ohms, with the monitor load, typically 75 ohms, coupled across resistor 350. As described, transistor 346 also provides a voltage drop that reduces the video signal to a swing of from about 0–1.0 volt.

In operation, and in a relatively cool state, the bias potentials of the transistors and signal amplitudes are generally as described. As the amplifier heats to an operating level, which may exceed 100° F. and approach 250° F., the emitter-collector impedance, and particularly the voltage drop, across the base-emitter junctions of transistors 328 and 336 begins to decrease with increasing temperature. This causes increased current flow through these transistors, which if uncompensated, tends to increase the voltage drops across the associated resistors. However, since transistors 340 and 342 are subjected to the same heating conditions as transistors 328 and 336, current flow through transistors 340 and 342 also increases with temperature, which increases bias potential applied to collector 334 of transistor 328. This compensates for the increased emitter-base current flow through transistor 328, maintaining operation of transistor 328 in its linear operating range. Thus, when cool, the potential supplied by transistor 342 is about 4.25 volts, and when hot, this potential rises to about 4.55 volts. As described, this potential is provided to transistor 340, which when cool, provides about 3.5 volts on its emitter, and provides about 4.1 volts when hot. These voltages are passed to collector 334 of transistor 328 via resistor 337, which drops the voltages to 2.9 volts cold and 3.22 volts hot.

The temperature related voltages of between 2.9 volts cold to 3.22 volts hot which are developed across resistor 337 are also applied to base 338 of transistor 336, compensating for the decreased voltage drop of transistor 336 due to heating. As described, when cool, about 2.9 volts is applied to base 338 of transistor 336, and when hot, this potential increases to about 3.22 volts. This increased base voltage offsets the lowered voltage drop of the base-emitter junction so that the bias potential at the emitter of transistor 336 is maintained at about 3.67 volts. This keeps the operating bias of transistor 336 constant and the gain of transistor 336 in its linear range so that the video signal swing on the collector of transistor 336 is maintained from about 740 mv to about 1780 mv regardless of temperature and the D.C. swing minimal.

The video signal output from transistor 336 is applied to emitter-follower output transistor 346, which is generally uncompensated with respect to temperature which, as it does not provide voltage gain, does not create a problem. Transistor 346, when cool, provides an output video signal of about 0.0 to 1.0 volts peak-topeak, and when hot, provides a video signal of about 29 mv to about 1.29 volts peak-to-peak. The D.C. fluctuation is minimized and, by adjusting the monitor brightness and contrast controls, offsets a slightly higher amplitude.

In accordance with the foregoing, it is apparent that the applicant has provided a system for transmitting video and sync signals in conductors adjacent to other conductors conveying digital data signals and bias power and ground potentials in a cable up to 800 feet in length. Further, the quality of the signal applied to the color monitor when a color background is used is such that ghosts and indistinct edges of images thereon are virtually eliminated, resulting in high quality video at the monitor at the aforementioned distances. Further yet, in one embodiment, temperature compensation is employed so that video amplifiers of the receiving signal conditioning network are temperature stabilized.

While the best mode of the invention disclosed herein is particularly set forth in specific embodiments, it will be apparent to those skilled in the art that modifications may be made thereto that fairly fall within the scope of the following appended claims, wherein I claim:

What is claimed is:

1. A D.C.-video range signal amplifier system comprising:
   an analog D.C.-video range signal source;
   a signal line from said source extending over a discrete distance and providing an output-direct current-video signal at its end; and
   a common emitter-type first transistor stage of a first polarity type and having resistors in its collector and emitter leads, with one terminal of the emitter connected resistor being connected to a common reference and with one terminal of the resistor connected to the collector of this transistor and having an opposite end terminal, the base of said first transistor stage being connected to said end of said signal line;
   a common emitter-type second transistor stage of an opposite polarity type to that of said first transistor stage, having its base connected to the collector of the first stage transistor, its collector, output, being connected through a third resistor to said common reference and its emitter connected to a source of operating potential;
   a third transistor stage including a transistor of an opposite polarity to said second transistor stage, the base of said third transistor stage being connected to the collector of said second transistor stage, the collector of said third transistor stage being connected to a source of operating bias through a collector-resistor, and the output of said third transistor stage appearing across a resistor connected between the emitter and said common reference, with said output being furnished as a direct current-video signal output for a monitor; and
   a temperature compensation circuit for said first and second transistor stages and comprising a pair of serially arranged, forwardly biased, base-emitter transistor circuits, the collector-base of each transistor being connected in series, said temperature compensation circuit being coupled between a source of bias and through a resistor to a collector of said first transistor stage and to the base of said second transistor stage;
   wherein said first and second transistor stages together exhibit gain, and whereby the base-emitter D.C. errors occurring by virtue of the parallel arranged and powered base-emitter junctions of said first and second transistor stages are compensated with respect to temperature, and the output of said second transistor stage is temperature stabilized.

2. A system as set forth in claim 1 wherein said source of bias is approximately 5.0 volts.

3. A system as set forth in claim 2 wherein said source of operating potential applied to said second emitter of said second transistor stage is approximately 3.67 volts.

4. A temperature compensated video amplification system as set forth in claim 3 wherein said signal source further comprises:
   signal current transfer means having an input coupled to receive said analog video output from said computer, and an output;
   an anti-ringing circuit having both reactive and resistive components coupled to said output of said transfer means;
   a reactive anti-reflective circuit coupled to said output of said transfer means; and
   a voltage divider coupled at a mid point thereof to said anti-ringing circuit for referencing the video signal from said last-named output about a first selected voltage level, wherein the video signal is attenuated to a selected amplitude and provided to one end of said signal line.

5. A temperature compensated video amplification system as set forth in claim 4 wherein said voltage divider references said video signal to a potential of about fifty percent of a bias power voltage potential, and said selected amplitude is up to about sixty percent of said video output from said computer.

6. A temperature compensated video amplification system as set forth in claim 5 wherein said signal current transfer means comprises a transistor coupled in emitter-follower configuration to said signal line, with power for said transistor provided by said voltage divider.

7. A temperature compensated video amplification system as set forth in claim 5 wherein said anti-ringing circuit comprises a first resistor coupled in series between said first voltage divider and said transistor, with a first capacitor coupled across said resistor, and a second capacitor in series with a second resistor, said first resistor, said first capacitor, and said second resistor damping ringing of said video output applied to said signal line.

8. A temperature compensated video amplification system as set forth in claim 7 wherein said anti-reflective circuit comprises a third resistor in series with a third capacitor, for damping reflected signals occurring on said signal line.

9. A temperature compensated video amplification system as set forth in claim 8 wherein said signal line is up to about 800 feet in length.

10. A temperature compensated video amplification system as set forth in claim 1 comprising vertical and horizontal sync multiplexing means receiving vertical and horizontal sync signals from said computer, and providing combined horizontal and vertical sync pulses in multiplexed relation, and demultiplexing means coupled to said multiplexing means, for demultiplexing said combined vertical and horizontal sync pulses and providing discrete said horizontal and vertical sync pulses to said monitor.

11. A temperature compensated analog video transmission system comprising:
   a source of analog video signals;
   a first signal conditioning network comprising:
      signal current transfer means having an input coupled to said source of video signals and responsive to said video signals for providing an output,
      an anti-ringing circuit having both resistive and reactive components coupled to said output of said transfer means,
      a reactive anti-reflective circuit coupled to said output of said transfer means, and
      a first voltage divider coupled at a mid point thereof to said anti-ringing circuit for referencing the video signal from said last named output about a first selected voltage level, and wherein the signal is attenuated to a selected amplitude;
   a cable having a plurality of insulated conductors up to about 800 feet in length, with a first of said conductors coupled at one end to said mid point of said first voltage divider; and
   a second signal conditioning network comprising:
      a source of bias potential and a reference potential,
      a second voltage divider network coupled at a mid point thereof to an opposite end of said first conductor, for referencing said signal to a selected voltage level,
      a first temperature compensating transistor having a first control input, a first biased terminal and a first reference terminal, said first control input and said first biased terminal responsive to said bias potential, for providing on said first reference terminal a temperature compensated bias potential that varies directly with temperature,
      a second temperature compensating transistor having a second control input, a second bias terminal and a second reference terminal, said second control terminal and said second bias terminal receiving said temperature compensated bias potential, for providing on said second reference terminal a temperature compensated bias potential which varies directly with temperature of said first and second temperature compensating transistors,
      a first modulating transistor having a control terminal coupled to said mid point of said second voltage divider, and receiving said video signal, and first and second terminals, said first terminal coupled to said second reference terminal and said second terminal coupled to said reference potential, providing therebetween a first modulated current flow responsive to said video signal so that as a voltage drop of said first modulating transistor decreases with increasing temperature, a voltage drop across said first and second temperature compensating transistors also decreases with said increasing temperature to provide an increase of said second bias potential,
      a second modulating transistor having a second control terminal receiving said temperature compensated bias potential from said second reference terminal and potentials of said first modulated current flow, and third and fourth terminals, said third terminal coupled to an operating bias potential and said fourth terminal coupled to said reference, providing a second modulated current flow therebetween responsive to said first modulated current flow so that as a voltage drop of said second modulating transistor decreases with said increasing temperature, said voltage drop across said first and second temperature compensating transistors decreases, stabilizing said operating bias at a selected potential, and
      a third modulating transistor having a third control terminal responsive to potentials of said second modulated current flow, and fifth and sixth terminals, said fifth terminal coupled to said bias potential and said sixth terminal coupled to said reference potential for providing a third modulated current flow between said fifth and sixth terminals, whereby potentials of said third modulated current flow are provided as a video output to a monitor.

12. A temperature compensated analog video transmission system as set forth in claim 11 comprising:
   vertical and horizontal sync multiplexing means receiving vertical and horizontal sync signals from said source of analog video signals, for combining and providing combined horizontal and vertical sync pulses in multiplexed relation, said combined horizontal and vertical sync pulses being applied to one end of a second of said conductors of said cable; and
   demultiplexing circuitry coupled to an opposite end of said second conductor, for demultiplexing said combined vertical and horizontal sync pulses and providing discrete said horizontal and vertical sync pulses to said monitor.

13. A temperature compensated analog video transmission system as set forth in claim 11 wherein said bias potential and said reference potential are supplied to said second signal conditioning network from a local power supply.

14. A temperature compensated analog video transmission system as set forth in claim 11 wherein said cable is up to 800 feet in length.

* * * * *